Dec. 14, 1948.    K. F. SEMISCH    2,456,218
JACK SUPPORT
Filed Oct. 4, 1946

INVENTOR.
Kurt F. Semisch.
BY Walter C. Rus,
Attorney.

Patented Dec. 14, 1948

2,456,218

UNITED STATES PATENT OFFICE 2,456,218

JACK SUPPORT

Kurt F. Semisch, Holyoke, Mass.

Application October 4, 1946, Serial No. 701,149

1 Claim. (Cl. 254—1)

This invention relates to jack mechanism and is directed more particularly to supporting means for a jack.

The principal object of the invention is the provision of a support for a jack to facilitate the placing of the jack under an automobile or the like.

It is well known that it is difficult to locate a jack beneath a vehicle particularly present-day vehicles which are low slung.

According to this invention, a platform for a jack is provided which has a plurality of supporting wheels to facilitate wheeling the platform beneath a vehicle in combination with yieldable means arranged and adapted whereby the platform may engage the ground when the jack takes up the load. In this way, the platform which has relatively more surface area than the ordinary jack base functions as a base or support for the jack so that it is possible to employ a jack more advantageously.

With the foregoing and various other novel features and advantages and other objects of my invention as will become more apparent as the description proceeds, the invention consists in certain novel features of construction and in the combination and arrangement of parts as will be hereinafter more particularly pointed out in the claim hereunto annexed and more fully described and referred to in connection with the accompanying drawings wherein:

Figure 1:
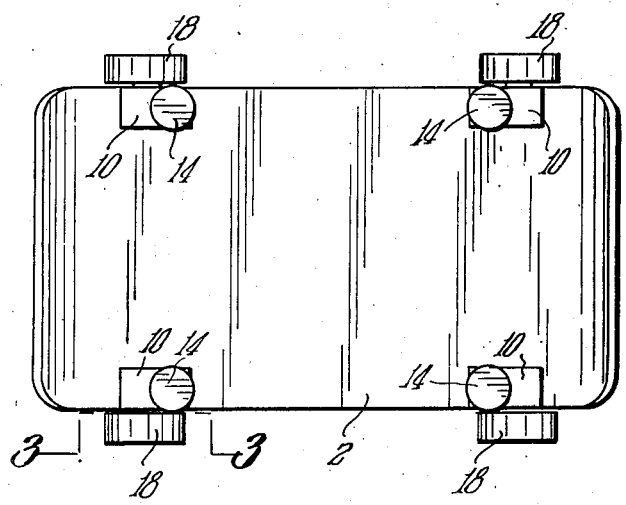
Fig. 1 is a plan view of jack supporting construction embodying the novel features of the invention.
Figure 2:
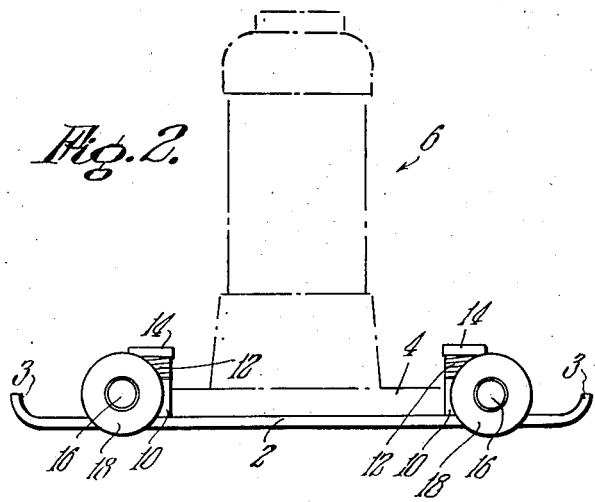
Fig. 2 is a side elevational view of the jack support shown in Fig. 1.
Figure 3:
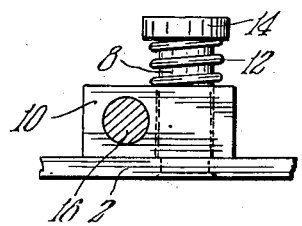
Fig. 3 is a sectional elevational view on the line 3—3 of Fig. 1.

Referring now to the drawings more in detail, the invention will be fully described.

A supporting plate 2 is provided which may be made from suitable material such as steel plate or the like. The plate is of considerable area and the base 4 of a jack 6, shown in dot-dash lines, may be secured thereto.

Opposite ends of the support 2 are arranged to curve upwardly at 3 as shown, to facilitate the plate being moved along the ground. With the jack secured to the support it may be pulled or shoved along the ground as by the handle of the jack.

Guides 8 have lower ends fixed in the support 2 and extend upwardly therefrom and blocks 10 are slidable up and down on the said guides. Compression springs 12 surround the guides 8 and are disposed between the blocks 10 and heads 14 of the guides.

Axles 16 are fixed to the blocks 10 and extend outwardly therefrom and transversely to the guides 8. Wheels 18 are rotatable on the axles and as shown are disposed outside the longitudinal edges of the support 2.

It may be desired in some cases to provide means to prevent rotation of the blocks 10 relative to the guides 8 and may be accomplished by a pin or dowel secured to the plate 2 which is slidable in the block 10.

The plate 2 having the jack secured thereto may be pulled or shoved along the ground so that it may be located beneath a vehicle and position the jack properly for operation in jacking up the vehicle. As the jack takes up the load the supporting plate which is supported by the wheels is depressed against the action of the springs 12 so that it rests upon the ground and supports the load.

The plate having a greater area than the base of the jack it provides a superior support and on soft mushy ground will adequately support the load while the jack base would not.

When the jack is relieved of the load the support 2 is elevated from off the ground by the springs so that it is supported by the wheels and may be withdrawn from beneath the vehicle.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description, and all modifications and variations as fall within the meaning and purview and range of equivalency of the appended claims are therefore intended to be embraced therein.

What it is desired to claim and secure by Letters Patent of the United States is:

A supporting structure for a lifting jack comprising in combination, a substantially flat rectangular plate for supporting a jack, cylindrical guides having lower ends secured to said plate at longitudinal marginal sides and adjacent opposite ends thereof and extending upwardly from the plate in parallelism, separate blocks above said plate slidable up and down on said guides, heads provided on upper ends of said guides, compression springs on said guides above said blocks and below said heads, separate axles secured to each of aid blocks and extending outwardly therefrom with their longitudinal axes disposed horizontally, and supporting wheels journalled on said axles disposed outside the longitudinal marginal edges of said plate.

KURT F. SEMISCH.

REFERENCES CITED

The following references are of record in the file of this patent:

UNITED STATES PATENTS

| Number | Name | Date |
|---|---|---|
| 191,824 | Batchelder | June 12, 1877 |
| 1,400,931 | Barker | Dec. 20, 1921 |
| 1,415,857 | Avery | May 16, 1922 |
| 1,477,790 | Townsend | Dec. 18, 1923 |
| 2,246,628 | Heckman | June 24, 1941 |

FOREIGN PATENTS

| Number | Country | Date |
|---|---|---|
| 732,000 | France | June 6, 1932 |